(12) United States Patent
Teichert et al.

(10) Patent No.: US 7,931,254 B2
(45) Date of Patent: Apr. 26, 2011

(54) HOISTING DEVICE

(75) Inventors: Paul Teichert, Sydals (DK); Rudolf F. Kirst, Bremen (DE)

(73) Assignees: PP Energy ApS, Nordborg (DK); Geo. Gleistein und Sohn GmbH, Bremen (DE)

( * ) Notice: Subject to any disclaimer, the term of this patent is extended or adjusted under 35 U.S.C. 154(b) by 0 days.

(21) Appl. No.: 12/374,033

(22) PCT Filed: Oct. 2, 2007

(86) PCT No.: PCT/DK2007/000422
§ 371 (c)(1),
(2), (4) Date: Apr. 15, 2009

(87) PCT Pub. No.: WO2008/040349
PCT Pub. Date: Apr. 10, 2008

(65) Prior Publication Data
US 2009/0267038 A1    Oct. 29, 2009

(30) Foreign Application Priority Data

Oct. 2, 2006    (DK) .................................. 2006 01276

(51) Int. Cl.
*B66D 1/50*    (2006.01)
(52) U.S. Cl. .......... 254/273; 254/371; 254/372; 254/385
(58) Field of Classification Search ................ 254/269, 254/270, 271, 272, 273, 284, 371, 372, 373, 254/385
See application file for complete search history.

(56) References Cited

U.S. PATENT DOCUMENTS

| | | | | |
|---|---|---|---|---|
| 3,866,718 A | * | 2/1975 | Hiergeist | 187/262 |
| 3,978,588 A | * | 9/1976 | Richardson et al. | 33/701 |
| 4,042,213 A | * | 8/1977 | Schreyer et al. | 254/270 |

(Continued)

FOREIGN PATENT DOCUMENTS

EP    0 849 208    6/1998

(Continued)

OTHER PUBLICATIONS

International Search Report; PCT/DK2007/000422; Jan. 10, 2008.

*Primary Examiner* — Emmanuel M Marcelo
(74) *Attorney, Agent, or Firm* — McCormick, Paulding & Huber LLP

(57) ABSTRACT

The invention relates to a hoisting device for use at a wind turbine, in particular for use in a wind turbine nacelle, which hoisting device 1 comprises a reel 4, a drive motor 12, control means 14 and a hoisting line 6. The hoisting line is a rope, which comprises synthetic fiber material, e.g. a high-tech rope. Hereby it is achieved that the hoisting device can be provided in a compact form, compared with traditionally used hoisting means, since the synthetic rope used as a hoisting line is characterized in having a high tensile strength and a low weight, whereby a rope having a comparable low weight can be used for lifting the same load, for which traditionally a steel wire having a relatively large weight has been used. Further, since the weight of the rope itself is relatively small, a drive motor, gear etc. having reduced capacity, power etc., can be used as compared to a traditional hoist, thereby also aiding in reducing the size, weight, complexity, cost etc. of the hoisting device.

22 Claims, 5 Drawing Sheets

U.S. PATENT DOCUMENTS

Figure 1:
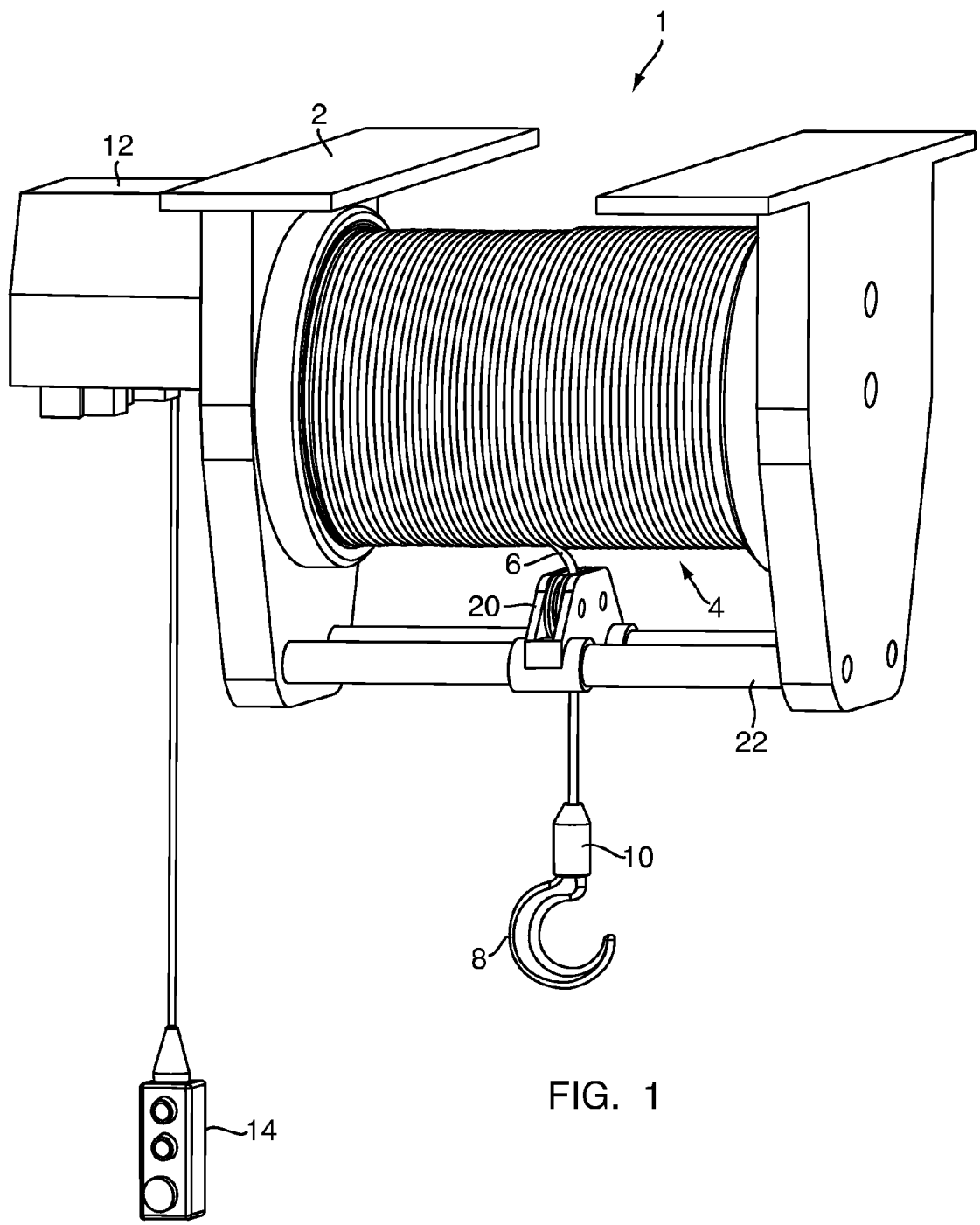

| | | | |
|---|---|---|---|
| 4,475,163 A | 10/1984 | Chandler et al. | |
| 4,921,219 A * | 5/1990 | Ottemann et al. | 254/284 |
| 5,522,582 A * | 6/1996 | Dilks | 254/323 |
| 5,546,672 A * | 8/1996 | Campbell et al. | 33/716 |
| 5,865,426 A * | 2/1999 | Kazerooni | 254/270 |
| 6,371,448 B1 | 4/2002 | De Angelis | |
| 6,386,513 B1 * | 5/2002 | Kazerooni | 254/270 |
| 6,910,679 B1 * | 6/2005 | Vogt et al. | 254/385 |
| 7,134,645 B1 | 11/2006 | Johnson | |
| 7,137,483 B2 * | 11/2006 | Kato et al. | 187/251 |
| 7,222,839 B2 * | 5/2007 | Taylor et al. | 254/270 |
| 7,261,278 B2 * | 8/2007 | Ball et al. | 254/325 |
| 7,275,733 B2 * | 10/2007 | Svitavsky et al. | 254/278 |
| 7,309,059 B2 * | 12/2007 | Marcil | 254/271 |
| 7,334,776 B2 * | 2/2008 | Kazerooni | 254/270 |
| 7,410,150 B1 * | 8/2008 | Falls | 254/272 |
| 2004/0013036 A1 * | 1/2004 | Fageras et al. | 367/15 |
| 2004/0099062 A1 * | 5/2004 | Smith et al. | 73/801 |
| 2007/0056801 A1 * | 3/2007 | Iversen | 182/141 |

FOREIGN PATENT DOCUMENTS

| | | |
|---|---|---|
| EP | 1 489 297 | 12/2004 |
| WO | 03/102409 | 12/2003 |
| WO | 2004/035454 | 4/2004 |
| WO | 2007/096008 | 8/2007 |

* cited by examiner

HOISTING DEVICE

FIELD OF THE INVENTION

The invention relates to a hoisting device for use at a wind turbine, in particular for use in a wind turbine nacelle, which hoisting device comprises in general a reel, drive means, e.g. a drive motor, control means and a hoisting line.

Further, the invention relates to uses of such a hoisting device.

BACKGROUND OF THE INVENTION

In connection with wind turbines it is normal practice to have a winch or hoist placed in the nacelle, for example placed in an upper position and possibly in such a manner that it can be displaced in the longitudinal direction of the nacelle and possibly also laterally. By means of such a winch or hoist various items such as tools, service parts, spare parts etc. may be lifted from the ground or sea surface up into the nacelle, for example through an opening in the floor or the side of the nacelle. Similarly, such a winch or hoist may also be used for lowering items down from the nacelle.

Such winches or hoists are equipped with a hoisting line in the form of a steel wire or a chain, which has the necessary proportions, e.g. diameter, for it to be able to handle the necessary weight, i.e. not only the weight of the item that is being lifted or lowered, but also the weight of the line that is hanging from the winch and down to the ground.

The problem of providing a hoisting line, e.g. a chain or a steel wire, with a sufficient strength has been enhanced by the fact that wind turbines have become increasingly higher in recent years, e.g. 100 to 150 meters, and they will in the next 5-6 years reach heights of 250 m. Thus, the line strength has to be correspondingly higher, meaning that the line has to be correspondingly thicker, since the line has to carry its own weight.

Thus, such winches or hoists tend to be heavy and voluminous, not only because they have to accommodate a considerable length of e.g. steel wire, but also because steel wire has a relatively large weight, whereby the reel has to be designed for handling such a relatively large weight, thereby also adding to the complexity and weight of the reel and the hoist in general. All in all, when using prior art hoists or winches equipped with steel wire in connection with e.g. wind turbines, a relatively large, heavy and complex hoisting structure has to be used, since the hoist in general has to be designed in order to cope with the relatively large weight. This gives rise to problems as regards for example the available space, for example when the nacelle of a wind turbine is concerned, where evidently a hoist can not be allowed to take up more space than absolutely necessary.

Thus, it is an object of the present invention to provide an improved hoisting device, in particular for use at a wind turbine.

SUMMARY OF THE INVENTION

The invention relates to a hoisting device for use at a wind turbine, in particular for use in a wind turbine nacelle, said hoisting device comprising a reel, a drive motor, control means and a hoisting line. In accordance with the invention said hoisting line is a rope, which comprises synthetic fibre material, e.g. a high-tech rope.

Hereby it is achieved that the hoisting device can be provided in a compact form, compared with traditionally used hoisting means, since the synthetic rope used as a hoisting line is characterized in having a high tensile strength and a low weight, whereby a rope having a comparable low weight can be used for lifting the same load, for which traditionally a steel wire having a relatively large weight has been used. Further, since the weight of the rope itself is relatively small, a drive motor, gear, etc. having reduced capacity, power etc., can be used as compared to a traditional hoist, thereby also aiding in reducing the size, weight, complexity, cost etc. of the hoisting device.

The rope may preferably be made completely of synthetic fibres or it may comprise e.g. natural fibres in addition to synthetic fibres. Furthermore, it will be apparent to the skilled person that other materials than fibres may be comprised in the rope.

In accordance with a preferable embodiment, said hoisting line may be a composite type rope.

Materials used for such fibre line ropes may for example be materials referred to in the trade as Dyneema®, (high modulus polyethylene) Spectra®, high molecular weight polyethylene (MWPE), Vectran® (high modulus polyester), Technora® (high modulus polyamide) or the like, which will be apparent to a person, that is skilled within the art of high-tech rope.

According to a particular advantageous embodiment said hoisting device may be designed for winding said hoisting line on said reel in two or more layers.

Traditionally, when high-tech ropes are used, it is preferred to use only one layer. However, in accordance with the invention, it has been realized that two, three, four or more layers can be used while still handling the rope in the manner required for maintaining the characteristics of the rope. Thereby, the length and/or diameter of the reel can be reduced, thereby contributing in achieving a compact hoisting device.

According to a further advantageous embodiment, said hoisting device may comprise means for facilitating the transition of the line between two layers, when winding and/or unwinding said line from the reel.

Hereby, it is achieved that the high-tech rope will not be adversely influenced when e.g. a second layer is formed, for example caused by the rope in the second layer crossing the rope in the first layer.

According to a still further advantageous embodiment, said reel may be adapted for accommodating said hosting line in one or more layers, where said reel may comprise grooves for the turns of the line in a first layer.

Hereby, the rope is accommodated on the reel in a manner, whereby the valuable characteristics of the high-tech rope is preserved and whereby an optimal contact with the reel is ensured.

According to a particular advantageous embodiment, said reel may be adapted for accommodating said hosting line in two or more layers, where said hoisting device is configured for accommodating turns of said hoisting line on said reel in a second layer and possibly also in subsequent layers.

Preferably, said hoisting device may comprise a line winding guide for guiding the winding and/or unwinding of said hoisting line in a first layer and possibly also in subsequent layers.

Hereby, it is ensured that the high-tech rope is treated and accommodated on the reel in the manner which is prescribed for maintaining its characteristics as regards strength, durability etc.

Advantageously, said hoisting device may comprise a line guide for guiding the line in a lateral direction in relation to said reel.

Hereby, it is achieved that the hoisting line may be maintained in the same position irrespective of the actual placing on the reel, and in such a manner that the high-tech rope is handled in the prescribed manner.

Preferably, at least parts of the surface of said reel may be adapted for enhancing the friction in relation to said hoisting line.

According to a further advantageous embodiment, a first end of said hoisting line may be connected to said reel using a connection adapted for said hoisting line of the high-tech type.

Hereby, it is achieved that said connection is performed in a manner adapted to the high-tech rope requirements, ensuring that the desirable qualities of the rope is reflected also in the connection to the reel.

According to a still further advantageous embodiment, a second end of said hoisting line may be connected to attachment means, e.g. a hook or the like, using a connection adapted for said hoisting line of the high-tech type.

Hereby, it is achieved that said connection is performed in a manner adapted to the high-tech rope requirements, ensuring that the desirable qualities of the rope is reflected also in the connection to for example a hook, which carries the load, and whereby the connection is capable of withstanding the same load as the rope.

According to a further advantageous embodiment, said hoisting device may comprise protective means for said hoisting line, arranged for example for the part of the hoisting line placed near the reel.

Hereby, it is achieved that the high-tech rope that may otherwise be sensitive to contact with edges, machine parts etc. particularly under load, can be protected herefrom, whereby the quality of the rope can be maintained and the effective service time of the rope can be enhanced.

Preferably, said protective means for said hoisting line may comprise sheathing or a sleeve, which may be extendible or foldable.

Advantageously, said hoisting device may comprise means for collecting and releasing said protective means for said hoisting line, e.g. in correspondence with the winding/unwinding of the line.

According to a particular advantageous embodiment, said hoisting device may comprise control means for providing end stop for the hoisting device.

Hereby, it is achieved that the hoisting device can be used in a highly automated manner and with an enhanced safety and efficiency.

Even further, said hoisting device may comprise control means for providing an automatic speed control of the hoisting device in dependence of the position of the line. Hereby, the user-friendliness of the hoisting device is greatly increased while providing a relatively quick operation, e.g. lifting and lowering items, and maintaining or even increasing the safety standards.

Advantageously, said hoisting device may comprise one or more marking means placed in or at the line and a corresponding sensor means for detecting said one or more marking means. Hereby, the end stop and/or the speed control functionality can be achieved in a flexible and efficient manner Preferably, said one or more marking means may comprise a metal part, e.g. a metal wire or foil or another suitable part that is detectable by said sensor means in a contactless manner. Hereby, the end stop and/or the speed control functionality can be achieved in a relatively simple, flexible and efficient manner.

Even further, said one or more marking means may comprise a tag or the like that is detectable by said sensor means in a contactless manner. Hereby, further features may be added, for example that the marking means may be provided with information, individual identifications, etc.

The invention also relates to the use of hoisting device for lifting and/or lowering objects such as tools, spare parts, service parts etc. in relation to a wind turbine.

According to a particular advantageous embodiment, said hoisting device may be placed in or at a nacelle.

According to a further advantageous embodiment, said hoisting device may be configured for being displaceable inside the nacelle, for example in the longitudinal direction and/or laterally.

THE FIGURES

Figure 3:
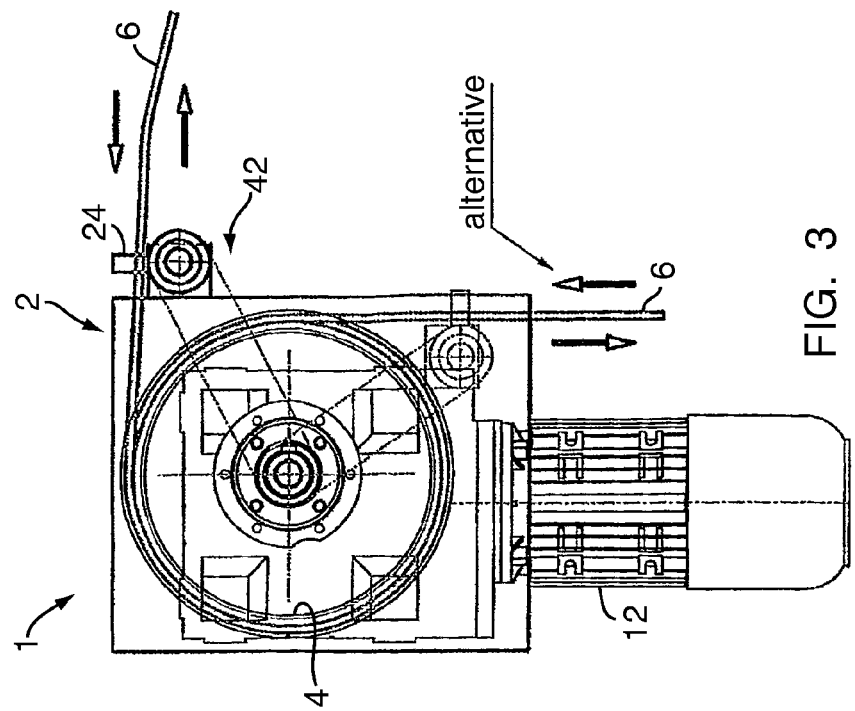
Figure 2:
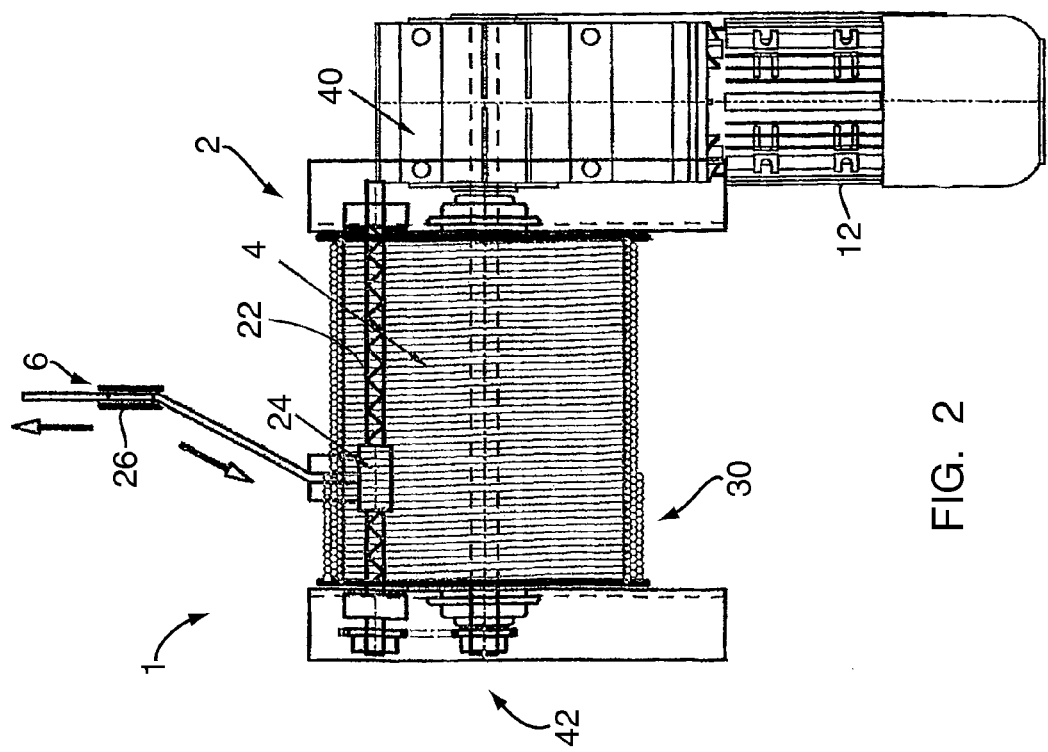
Figure 4:
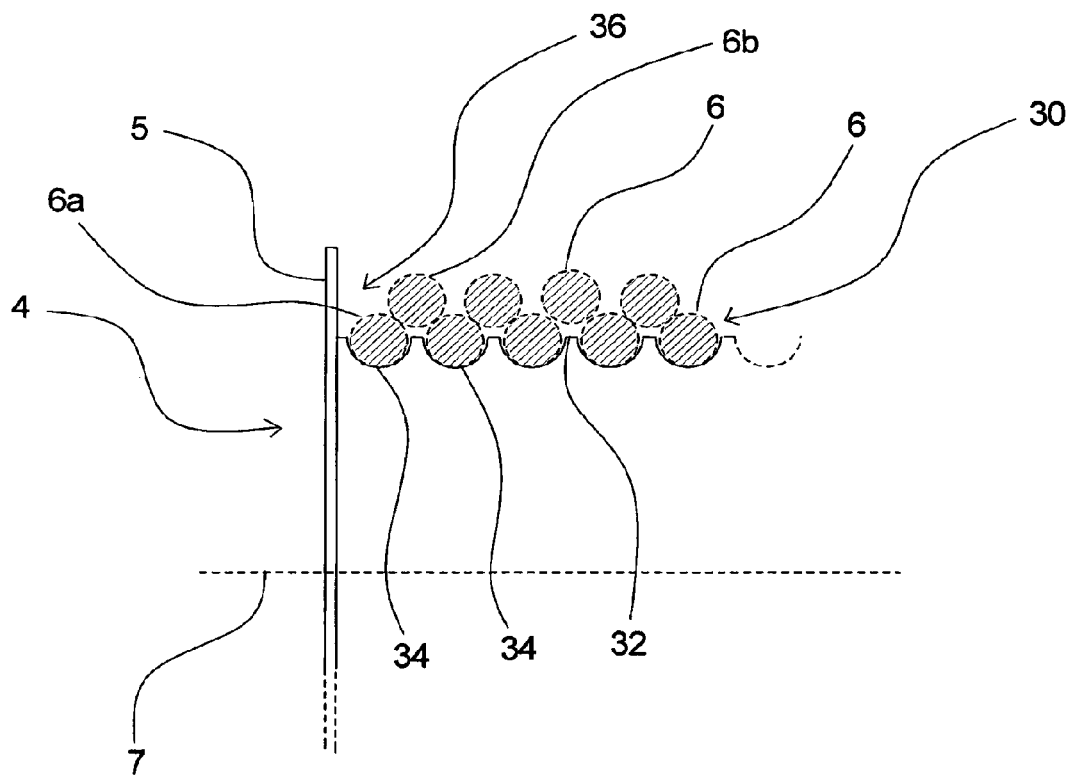
Figure 5:
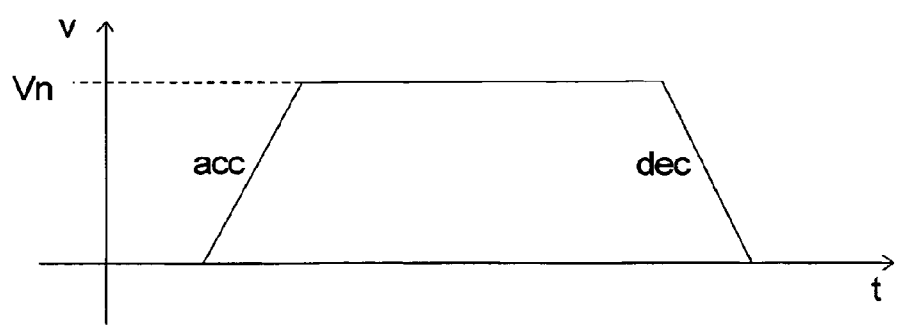
Figure 6:
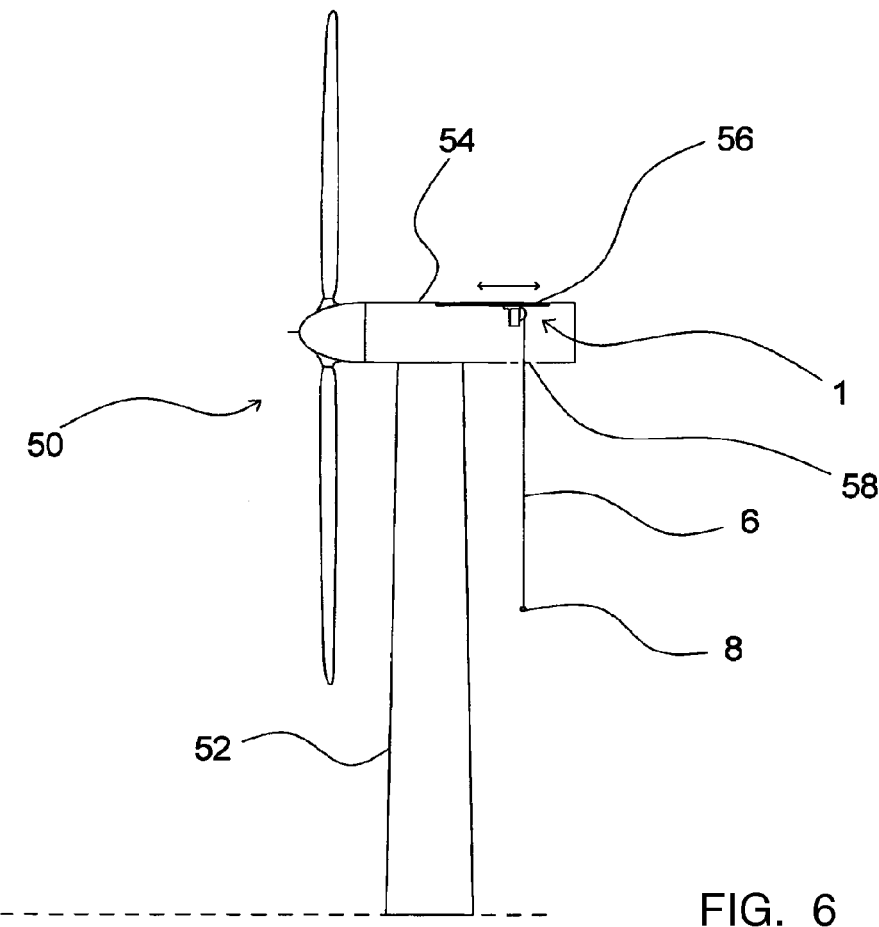
Figure 7:
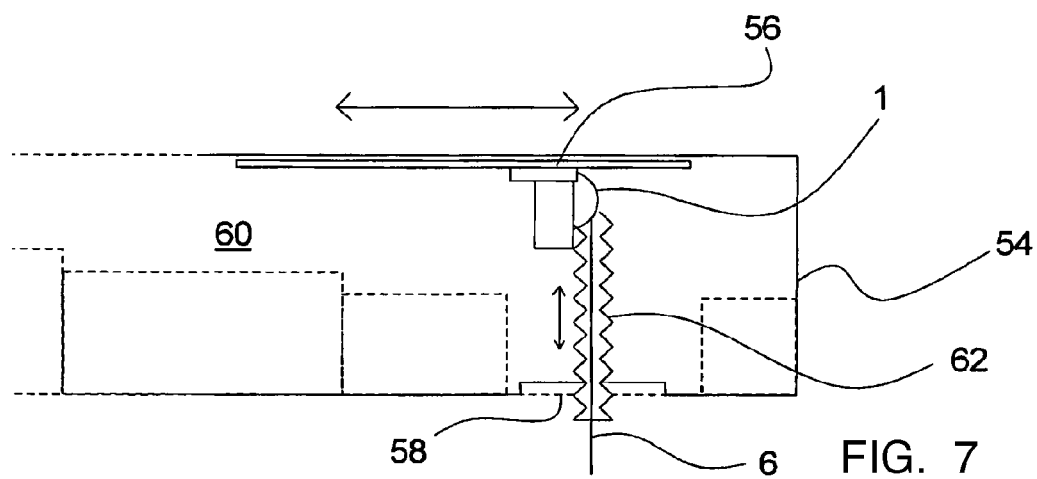
Figure 8:
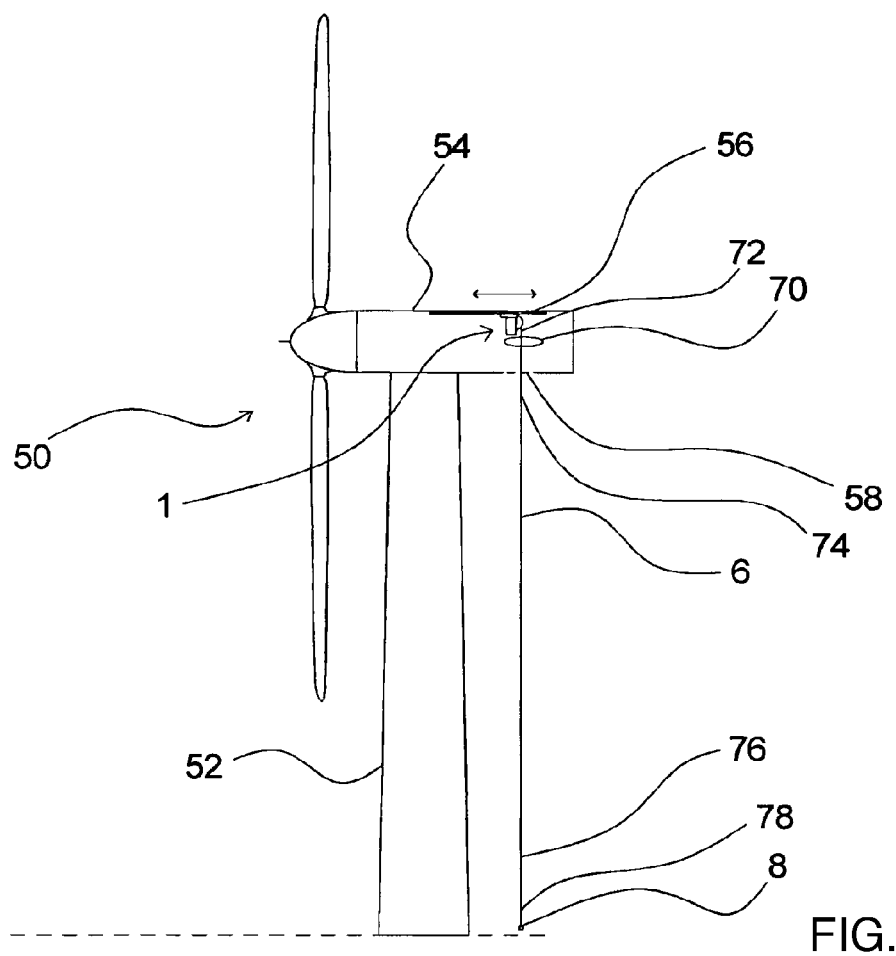

The invention will be explained in further detail below with reference to the figures of which FIG. 1 shows in a perspective view a hoisting device according to an embodiment of the invention, FIG. 2 shows a hoisting device according to a further embodiment of the invention seen in a side view, FIG. 3 shows the hoisting device shown in FIG. 2, seen from the end, FIG. 4 shows in a sectional view part of a reel with two layers of line according to a further embodiment of the invention, FIG. 5 shows a typical work sequence for a hoisting device according to the invention, FIG. 6 illustrates the use of a hoisting device according to the invention in connection with a schematically illustrated wind turbine, FIG. 7 shows in an enlarged view a further embodiment of the invention in connection with a wind turbine nacelle, and FIG. 8 illustrates an embodiment of a hoisting device using an end stop functionality and e.g. a near-the-end functionality.

DETAILED DESCRIPTION

A hoisting device 1 is shown in FIG. 1 in a general manner, showing a frame 2 adapted for mounting the device to for example a crane trolley or the like, by means of which the device 1 can be moved. The frame 2 carries a reel or drum 4, which can be driven by means of a drive motor 12, and which accommodates the hoisting line 6, which shall be described in further detail below. The manner, in which the line is accommodated on the reel 4 shall also be further described in the following.

The hoisting line 6 is equipped with means such as e.g. a hook 8 for attaching an item to the line. As shown, connecting means 10 may be used for connecting the hook 8 to the line 6. The hoisting line 6 is wound on the reel 4 in one or more layers in such a manner that the line 6 is arranged in turns next to each other, guided by a line guiding arrangement 20, that is arranged for moving forth and back along e.g. traversing means 22.

Furthermore, means 14 for controlling the hoisting device is connected to the drive motor 12, which may comprise or be connected to a control system for controlling and/or regulating parameters such as speed, acceleration etc. and/or for performing a protection, e.g. an overload protection of the device and its components. Even further, such a control system for the hoisting device may comprise an end stop functionality, e.g. a system for ensuring that the hoisting device stops automatically, when a predetermined length of hoisting line has been unwound, when a predetermined length of hoisting line has been wound onto the reel or when the end of the hoisting line, e.g. the connecting means 10, is within a predetermined distance from the reel 4, the frame 2 or any structure, to which the hoisting device is connected. Furthermore, such a control system may be used for providing a desired lifting and/or lowering speed profile, which will be described in further detail later on.

The hoisting line 6, which is a particular important component in accordance with the present invention, is of a type, which may be referred to as a high-tech rope or the like, e.g. a type of rope comprising synthetic raw materials such as for example synthetic fibres etc. The rope may preferably be made completely of synthetic fibres or it may comprise synthetic fibres in combination with other fibres, e.g. natural fibres. Further, the rope may be of a type referred to as a composite type rope, e.g. comprising further synthetic materials in addition to fibres. Such ropes, e.g. high-tech ropes, are characterized by having a e.g. high tensile strength, low weight and small dimensions in comparison to other hoisting means having the same strength, low elongation etc. Materials used for such fibre line ropes may for example be materials referred to in the trade as Dyneema®, (high modulus polyethylene) Spectra®, high molecular weight polyethylene (MWPE), Vectran® (high modulus polyester), Technora® (high modulus polyamide) or the like, which will be apparent to a person, that is skilled within the art of high-tech rope.

A further embodiment of the invention is shown in FIGS. 2 and 3, where the hoisting device 1 is shown from the side and the end, respectively. A frame 2 or the like carries the reel 4, which is driven by e.g. an electric motor 12 via a gearbox arrangement 40, placed at the end of the reel 4. At the other end of the reel a drive mechanism 42 for a traversing mechanism 22 for the line winding guide 24 is located. Furthermore, a separate line guide 26 may be used for keeping the line 6 at a specific location, for example a location in the lateral direction below the hoisting arrangement, irrespective of the position of the line winding guide 24. As shown in FIG. 3, the line winding guide 24 and the line guide 26 may be located in different positions, depending for example on the available space at the location, where it is intended to use the hoisting device 1.

As indicated in FIG. 2, the line 6 may be wound on the reel 4 in three layers 30, controlled by the line winding guide 24 as described above. When high-tech rope is used, it may be preferable to use only one or two layers 30, but it will be understood that three or more layers 30 may be used in accordance with the invention, since this will reduce the necessary length and/or diameter of the reel 4. However, this may require certain arrangements in order to maintain the desirable properties of the high-tech rope, which is achieved in accordance with further embodiments of the invention.

In FIG. 4 a part of a reel 4 with two layers 30 of line 6 according to a further embodiment of the invention is shown in a sectional view. Thus, the left end of the reel 4 is shown with an end plate 5 and an essentially cylindrical reel surface 32 which as shown has a number of grooves 34 for accommodating the line 6. In accordance with customary design, the grooves 34 may be essentially semicircular with a diameter which is larger than the diameter of the line 6, for example 10-20% larger. It will be understood that the line 6 is attached at its end to the reel 4, for example to the right in FIG. 4 (not shown), which may involve connection means and/or an arrangement specially designed for a high-tech rope. However, it is noted that the tension in the line 6 is transferred to the reel 4 not primarily by the connection of the end of the line to the reel 4, but by the friction between the last revolutions of line, e.g. the last two or three revolutions, and the surface of the reel, e.g. the surface of the grooves 34. It will therefore be understood that the length of the line 6 is such that it will never be necessary to rewind the last revolutions of the line, when the hoisting device 1 is used for lifting and lowering objects.

As shown in FIG. 4, the line 6 is placed in the second layer between the turns of the first layer. Similar will apply if a third layer is involved. In connection with the transition from the first layer to the second layer special means 36 may be arranged in accordance with a further embodiment of the invention in order to maintain the desired properties of the high-tech rope and in order to maintain optimal service life of the rope, e.g. in order to achieve that the line 6 will not have a negative influence on the line 6a in the outermost turn of the first layer, when the line 6 starts the outermost turn 6b in the second layer, and vice versa. Such arrangements may involve the shape and/or design of the surface 32 of the reel 4, the end plate 5 and/or separate means arranged here.

It will be understood that the connections at the two ends of the line 6, i.e. to the attachment means 8, e.g. the hook, at one end, and to the connection means at the other end, by means of which the line is connected to the reel 4, are specifically made to meet the requirements of the high-tech rope, e.g. using splice connections, moulding techniques etc.

In FIG. 5 is shown a typical work sequence for a hoisting device according to the invention, showing the operating speed versus time. As mentioned, such a hoisting arrangement has advantages as regards low complexity, low weight, including low weight of movable parts, etc. whereby not only an enhanced nominal operational speed $V_n$, is achieved, but also improved acceleration (acc) and deceleration (dec) is achieved. It is noted that prior art service hoisting devices used in wind turbines at heights of for example 100 meters and for lifting loads of for example 500 kg have a maximum speed of 7-8 m/min, whereas a hoisting device according to the invention for the same purpose and height can operate at 20 m/min or more without requiring special components, i.e. with essentially the same size of drive motor, gears, power supply etc. and with a size of the complete hoisting device that allows it to be used in the relatively confined space in e.g. a wind turbine nacelle. It will thus be seen that where it would take app. 13 minutes to lift an object up to a 100 meter high wind turbine nacelle with a prior art hoisting device, this can be done with a hoisting device according to the invention within app. 5 minutes, thereby reducing idle time and enhancing work efficiency when wind turbines are serviced for example.

Further, it is noted that the improved acceleration and/or deceleration characteristics that are achieved by the invention, are of particular importance in connection with sea-based wind turbines, where items are hoisted from or lowered down to e.g. a service vessel that is subjected to waves and therefore may be moving up and down. For example, when using a hoisting device according to the invention, an item may be lifted from a moving deck of the vessel with such an acceleration and velocity that the item will be removed such a distance from the deck that the deck will not hit the item at a subsequent crest of a wave.

In FIG. 6 the use of a hoisting device according to the invention is illustrated in connection with a schematically illustrated wind turbine 50. The hoisting device 1 is shown placed in the nacelle 54 and carried by a trolley 56, whereby it can be moved, for example in the longitudinal direction of the nacelle 54. Further, it is shown that the nacelle 54 has an opening 58 in the floor, for example an openable hatch or the like, and that the hoisting line, i.e. the high-tech rope 6 can be lowered and lifted through the opening 58, when the hoisting means 1 is located above the opening 58. As shown, the hoisting line 6 and the attachment means 8, e.g. a crane hook or the like, can thus be moved alongside the tower 52 of the wind turbine down to the ground/or sea level.

It will be understood that since in accordance with the invention the hoisting line 6 is of a considerable lesser weight than ordinarily used hoisting line, steel wire or chain, the end of the line and the attachment means 8 may be influenced by the wind when no object is being lowered or lifted and thus there is a risk that the line may contact parts of the wind turbine. In order to avoid this, the line 6, the free end of this and/or the attachment means 8, e.g. a hook, may be provided with protection means, that for example can prevent the hook from being caught by any part on the wind turbine or any part in the vicinity hereof In FIG. 7 part of a nacelle 54 is shown in a schematic manner with a hoisting device 1 according to an embodiment of the invention. The hoisting device is as described above carried by a trolley 56 in such manner that it can be moved in the interior 60 of the nacelle 54, e.g. past the wind turbine components that occupy the interior 60 as indicated. As mentioned above, the hoisting line used in accordance with the invention, i.e. a high-tech line 6, may be sensitive to e.g. abrasive, rubbing or otherwise harmful contact with other parts and measures are therefore taken to ensure the proper handling of the high-tech line 6, in particular to ensure that the line 6 does not contact for example other components in the nacelle 54 or for example the edges of the opening 58 in the floor of the nacelle. As shown in FIG. 7, this may be in the form of protective means 62, for example a sheathing, a sleeve or the like, which furthermore may be bellow-shaped, corrugated or the like as indicated in FIG. 7. Such protective means 62 may have a length corresponding to the distance from the reel, where components and parts are placed near the line, for example as shown from the reel of the device down to a level below the opening 58. Further the protective means 62 may be extendible or foldable, for example in such a manner that when the end of the line 6, e.g. the attachment means 8, reaches the end of the protective means 62, the protective means 62 is being brought up together with the end of the line 6 and collected at the reel. Other manners of designing such protective means are possible, which will be apparent to a skilled person.

As mentioned above, an end stop functionality may be provided for and/or a functionality that ensures that a speed regulation takes place, depending on e.g. the position of the end of the line 6, e.g. the hook 8 or similar attachment means. Such a functionality may be more or less automatic, but preferably it will perform in a fully automated manner and may be integrated with the control system that is connected to the drive motor 12 of the hoisting device 1.

According to a particular embodiment, the hoisting line 6 is provided with one or more marking means that is/are detectable by one or more sensor means, preferably in a contactless manner. For example, the marking means may be a piece, e.g. a wire, a foil or similar means, of metal, for example cupper, aluminium, iron and/or alloys that is e.g. embedded in the hoisting line at one or more positions and which may be detected by the sensor means e.g. magnetically, electromagnetically, using radio frequency means, optical means etc. It will be understood that other materials than metals may be used as well for providing such marking means, e.g. magnetic or optically detectable materials and means. Even further, it will be understood that the marking means may be tags, chips or the like, for example radio frequency tags or the like.

Such a marking means may be placed in/at the hoisting line 6 at a position near the end of the line, and a sensor means may be placed in a corresponding manner, whereby the hoisting device 1 will be stopped before the end of the line reaches the e.g. reel 4, the frame 2, the traversing mechanism 22 or any other part of the hoisting device 1 or any structure that carries the hoisting device. It will also be understood that a marking means may be placed at a position corresponding to a maximum length of line having been unwound, e.g. a length essentially corresponding to the distance from a nacelle 54 to the ground or sea level, whereby it will be prohibited that more line than necessary is unintentionally unwound and/or to prohibit that too much line is unwound to assure that the necessary number of windings remain on the reel 4 to maintain the necessary friction between the line 6 and the reel 4.

Furthermore, one or more marking means may be placed at other positions in order to achieve further advantages. For example, at marking means may be placed at a position, where the end of the line 6 is near the e.g. nacelle of a wind turbine, and whereby, when the sensor means detects this marking means, the system is automatically controlled to maintain e.g. a predetermined speed and/or to increase or reduce the speed to a predetermined speed. For example, when the line is unwound and the particular marking means passes the sensor means, the system allows or controls the hoisting device 1 to perform with e.g. a predetermined maximum speed, whereas, when the hoisting line 6 is returned and the particular marking means passes the sensor means, the system allows or controls the hoisting device 1 to slow down and perform with or below e.g. a predetermined safe speed, for example when handling loads inside a nacelle 54 or near e.g. a nacelle.

Similar, such marking means may be placed at other positions of the line 6, whereby the system will automatically slow down, when a load handled by the hoisting device is getting near to e.g. the ground or a service ship.

Similar, such marking means may be placed at positions of the line 6, where it is desired that the system will automatically perform an increase in speed, e.g. depending on the direction, in which the line is moved, i.e. up or down.

Thus, a number of e.g. automatically achieved speed zones may be defined. Further, it will be seen that the limits for such zones may be laid down and varied/adjusted in dependence on the actual conditions and/or user specifications in a flexible and relatively simple manner An example of such an embodiment is illustrated in FIG. 8 in a schematic manner. This figure corresponds to FIG. 6, but the hoisting line 6 is shown in a position, where the end of the line is near the ground. A sensor means 70 is schematically shown placed at a position near the hoisting device itself, but it will be apparent that it can be placed at other locations, for example near the opening 58 in the nacelle 54. As indicated, the sensor means 70 preferably performs a detection around the line 6, e.g. in a 360° arrangement.

The line 6 may as shown be equipped with four marking means 72, 74, 76 and 78, and it will be understood that when the line 6 is being lowered from the position shown in FIG. 8, the hoisting device 1 will stop, when the marking means 72 passes the sensor means 70. A marking means 74 may be placed as indicated in order to have the hoisting device 1 automatically slow down, when the line 6 is lowered and is getting near the ground or a service ship, if the wind turbine is placed at sea. When the line 6 is being lifted up again and the marking means 74 is passing the sensor means, the hoisting means 1 may automatically increase its speed to a maximum speed, until the marking means 76 passes the sensor means, where the hoisting device is controlled to reduce its speed, e.g. when the load lifted by the line 6 is inside the nacelle and caution is necessary. Finally, when the marking means 78 reaches the sensor means, the line is stopped. Similar will apply, when the line 6 is lowered again, etc.

It will be apparent to the skilled person, that this arrangement can be varied in numerous manners, that the number of marking means and their position can be varied in numerous manners, and that more than one sensor means can be used.

Thus, a desired speed profile can be achieved in a flexible and automated manner, whereby the efficiency as well as the safety standard of the hoisting device is enhanced.

It will be understood that the invention is not limited to the particular examples described above and shown in the drawings but may be modified in numerous manners, used in a wide range of applications and manufactured in materials commonly used within the field. Thus, it will be understood that the hoisting device according to the invention may be designed in a multitude of varieties within the scope of the invention as specified in the claims.

The invention claimed is:

1. A wind turbine hoisting device for use in a wind turbine nacelle, the hoisting device comprising
   a reel,
   a drive motor,
   control means and
   a hoisting line,
   wherein said hoisting line is a rope comprising synthetic fibre material, and wherein at least said reel of the wind turbine hoisting device is disposed within the wind turbine nacelle.

2. The hoisting device according to claim 1, wherein said hoisting line is a composite type rope.

3. The hoisting device according to claim 1, wherein said hoisting device is designed for winding said hoisting line on said reel in two or more layers.

4. The hoisting device according to claim 3, wherein said hoisting device comprises means for facilitating the transition of the line between two layers, when winding and/or unwinding said line from the reel.

5. The hoisting device according to claim 1, wherein said reel is adapted for accommodating said hosting line in one or more layers, where said reel comprises grooves for the turns of the line in a first layer.

6. The hoisting device according to claim 5, wherein said reel is adapted for accommodating said hosting line in two or more layers, where said hoisting device is configured for accommodating turns of said hoisting line on said reel in a second layer and possibly also in subsequent layers.

7. The hoisting device according to claim 5, wherein said hoisting device comprises a line winding guide for guiding the winding and/or unwinding of said hoisting line in a first layer.

8. The hoisting device according to claim 1, wherein said hoisting device comprises a line guide for guiding the line in a lateral direction in relation to said reel.

9. The hoisting device according to claim 1, wherein at least parts of the surface of said reel is adapted for enhancing the friction in relation to said hoisting line.

10. The hoisting device according to claim 1, wherein a first end of said hoisting line is connected to said reel using a connection adapted for said hoisting line.

11. The hoisting device according to claim 1, wherein a second end of said hoisting line is connected to attachment means using a connection adapted for said hoisting line.

12. The hoisting device according to claim 1, wherein said hoisting device comprises protective means for said hoisting line, arranged for the part of the hoisting line placed near the reel.

13. The hoisting device according to claim 12, wherein said protective means for said hoisting line comprises sheathing or a sleeve, which may be extendible or foldable.

14. The hoisting device according to claim 12, wherein said hoisting device comprises means for collecting and releasing said protective means for said hoisting line in correspondence with the winding/unwinding of the line.

15. The hoisting device according to claim 1, wherein said control means comprises an end stop for the hoisting device.

16. The hoisting device according to claim 1, wherein said control means comprises an automatic speed control of the hoisting device in dependent of the position of the line.

17. The hoisting device according to claim 15, wherein said hoisting device comprises one or more marking means placed in or at the line and a corresponding sensor means for detecting said one or more marking means.

18. The hoisting device according to claim 17, wherein said one or more marking means comprises a metal part, that is detectable by said sensor means in a contactless manner.

19. The hoisting device according to claim 17, wherein said one or more marking means comprises a tag that is detectable by said sensor means in a contactless manner.

20. The hoisting device in accordance with claim 1, configured for lifting and/or lowering objects in relation to a wind turbine.

21. The hoisting device according to claim 20, wherein said hoisting device is placed in or at a nacelle.

22. The hoisting device according to claim 21, wherein said hoisting device is configured for being displaceable inside the nacelle.

* * * * *